United States Patent [19]

Choi

[11] Patent Number: 5,038,010
[45] Date of Patent: Aug. 6, 1991

[54] APPARATUS FOR WELDING LEADS TO THE ELECTRODES OF AN ULTRAHIGH VOLTAGE MERCURY VAPOR LAMP

[75] Inventor: Yongtae Choi, Jecheon, Rep. of Korea

[73] Assignee: Samsung Electron Devices Co., Ltd., Rep. of Korea

[21] Appl. No.: 443,519

[22] Filed: Nov. 29, 1989

[51] Int. Cl.$^5$ ............................................. B23K 11/00
[52] U.S. Cl. ..................................... 219/56.1; 228/4.5
[58] Field of Search ................. 219/56.1, 95, 96, 118; 228/4.5; 313/318

[56] References Cited

U.S. PATENT DOCUMENTS

| | | | |
|---|---|---|---|
| 2,882,387 | 4/1959 | Rively et al. | 219/96 |
| 2,892,923 | 6/1959 | Kuebler | 219/96 |
| 3,456,091 | 7/1969 | Warner | 219/56.1 |
| 3,668,456 | 6/1972 | Anderson | 313/318 |
| 4,584,454 | 4/1986 | Feuersauger et al. | 219/118 |

Primary Examiner—Clifford C. Shaw

[57] ABSTRACT

There is disclosed an apparatus for welding leads to the electrodes of an ultrahigh voltage mercury vapor lamp. The apparatus comprises a base having guide rails, a clamp mounted on the guide rails, a working part for welding the leads to the electrodes and then cutting the leads, and a lead supplying mechanism for introducing the leads into the working part.

6 Claims, 2 Drawing Sheets

APPARATUS FOR WELDING LEADS TO THE ELECTRODES OF AN ULTRAHIGH VOLTAGE MERCURY VAPOR LAMP

BACKGROUND OF THE INVENTION

The present invention concerns an apparatus for welding leads to the electrodes of an ultrahigh voltage mercury vapour lamp.

In a conventional process for welding leads to the electrodes of an ultrahigh voltage mercury vapour lamp, nickel leads are cut to have a specified length, and manually spot-welded to the tungsten electrodes of the mercury vapour lamp. The drawbacks of such a prior art are that the welding is not precisely performed because of manually positioning the nickel leads relative to the tungsten electrodes, and that the working efficiency is lowered because of manually cutting the leads so as to increase the number of the working steps.

SUMMARY OF THE INVENTION

In order to obviate the drawbacks of the prior art, the present invention intends to provide an apparatus for welding leads to the electrodes of an ultrahigh voltage mercury vapour lamp which performs a precise welding so as to regularize the products, and automatizes the welding process so as to increase the working efficiency.

According to the present invention, an apparatus for welding leads to the electrodes of an ultrahigh voltage mercury vapour lamp comprises a base having guide rails, a clamp mounted on the base for holding the ultrahigh voltage mercury vapour lamp, the clamp comprising a fixed jaw and moveable jaw, a working part for welding the leads to the electrodes and then cutting the leads, the working part comprising a moveable block having lead passages, a lead supplying mechanism for introducing the leads into the lead passages, and the leads being wound around bobbins.

DETAILED DESCRIPTION OF THE INVENTION

Figure 1:
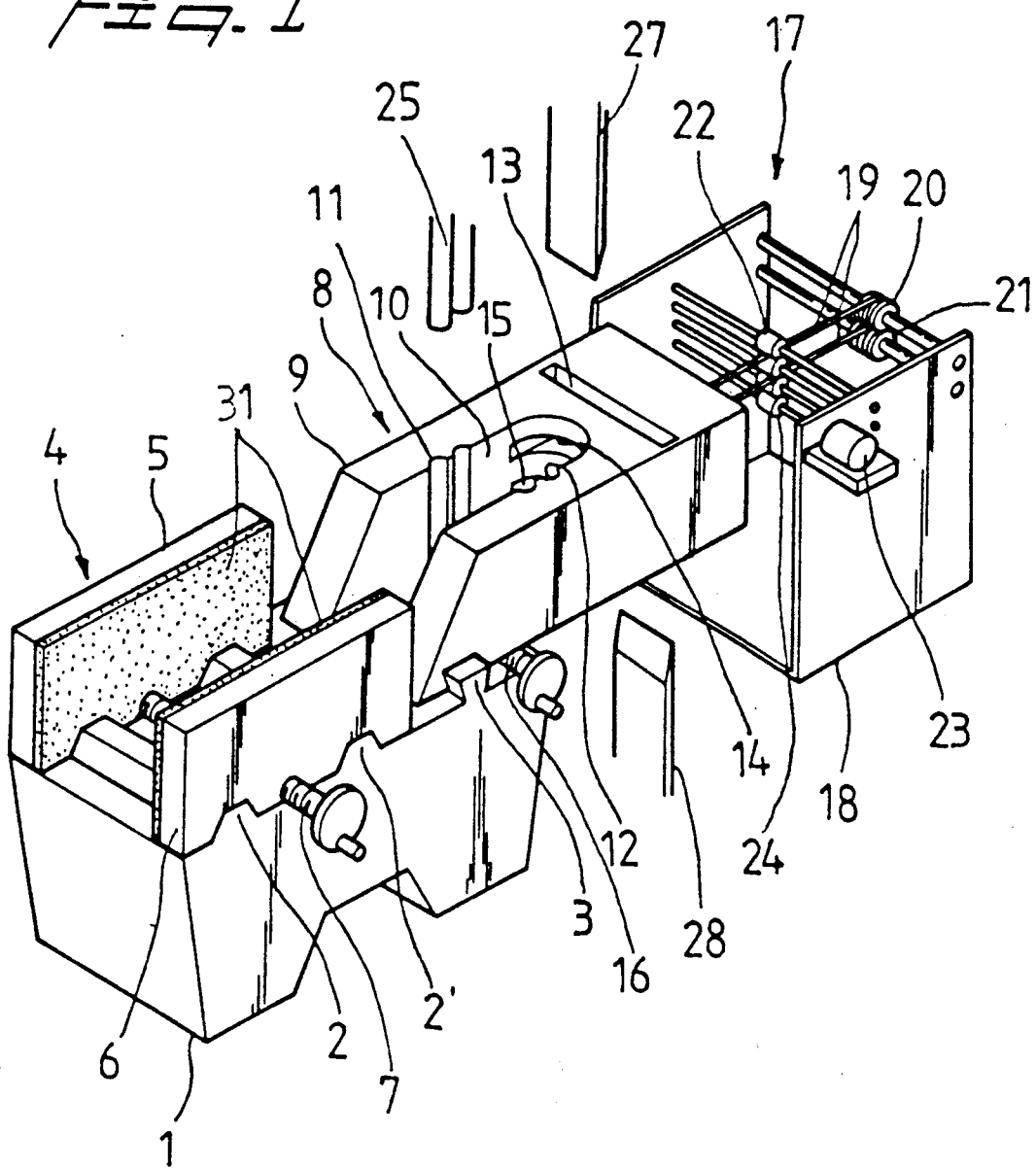
FIG. 1 is a perspective view of the inventive welding apparatus.
Figure 2:
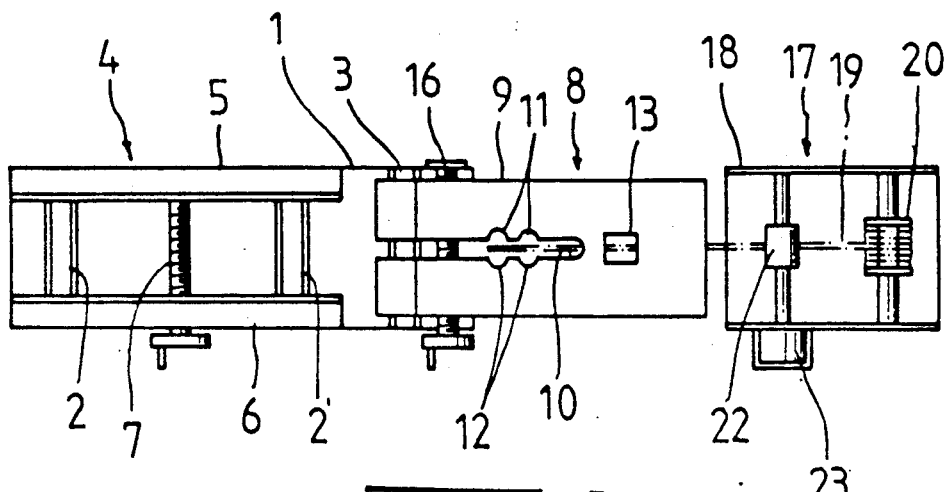
FIG. 2 is a plane view of FIG. 1.

The present invention will now be described more specifically with reference to the drawings attached only by way of example.

On base 1 are formed guide rails 2, 2', 3 crosswise thereto. Although the guide rails 2, 2', 3 are protruded from the surface of the base 1, they may have a form depressed lower than the surrounding surfaces. A clamp 4 is provided on the guide rails 2, 2'. The clamp 4 comprises a fixed jaw 5 and a moveable jaw 6 disposed parallel to each other. The fixed jaw 5 is fixedly attached to one side of the base 1. The moveable jaw 6 is slidably mounted on the guide rails 2 and 2'. An adjusting screw 7 is rotatably attached to the fixed jaw 5 at one end thereof, and screwed through the moveable jaw 6 at the other end thereof.

On the guide rail 3 is slidably mounted the moveable block 9 of working part 8. The block 9 includes a horizontally extending opening 10 for receiving the tungsten electrodes of the mercury vapour lamp, two semi-circular vertical grooves 11, 12 formed on both sides of the opening 10, a cutting aperture 13 vertically formed near the opening 10, and lead passages 14, 15 extended from the back side of the block 9 to the opening 10. The lead passages 14, 15 communicate into the cutting aperture 13, which also communicates into the opening 10 horizontally. The lead passages taper toward the opening 10. The block 9 is moveable on the guide rail 3 by rotating an adjusting screw 16.

Behind the working part 8 is provided a lead supplying mechanism 17. The lead supplying mechanism 17 comprises a stand 18, bobbins 20, 21 supported on the rear part of the stand 18 for winding the nickel leads, a plurality of rolls 22 provided before the bobbins 20, 21 and vertically contacting to each other, and a driving roll 24 contacting the lowermost one of the plurality of rolls 22. The driving roll 24 is mounted on the driving shaft of a driving means 23. The bobbins 20, 21 are vertically arranged to each other. Through the semi-circular vertical grooves 11 and 12 of the working part 8 are guided conventional spot-welding electrodes 25 and 26 into and out of the opening 10. The means for moving the electrodes 25 and 26 may be a pressurized cylinder or rocker arm type. Cutting blades 27 and 28 are moved into and out of the cutting aperture 13 by means of pneumatic cylinders 29 and 30. Reference numeral 31 is a cushion for protecting the mercury vapour lamp when it is clamped by the clamp 4.

In operation of the welding apparatus of the present invention, the ultrahigh voltage mercury vapour lamp P is first placed between the fixed jaw 5 and moveable jaw 6 of the clamp 4 with the tungsten electrode E in the opening 10, securely fixed therebetween by rotating the adjusting screw 7. Then, the adjusting screw 16 is rotated to move the moveable block 9 so as to center the tungsten electrode E in the opening 10. The nickel leads 19 are inserted between the rolls 22 and the driving roll 24, and the driving means 23 is driven.

Figure 3:
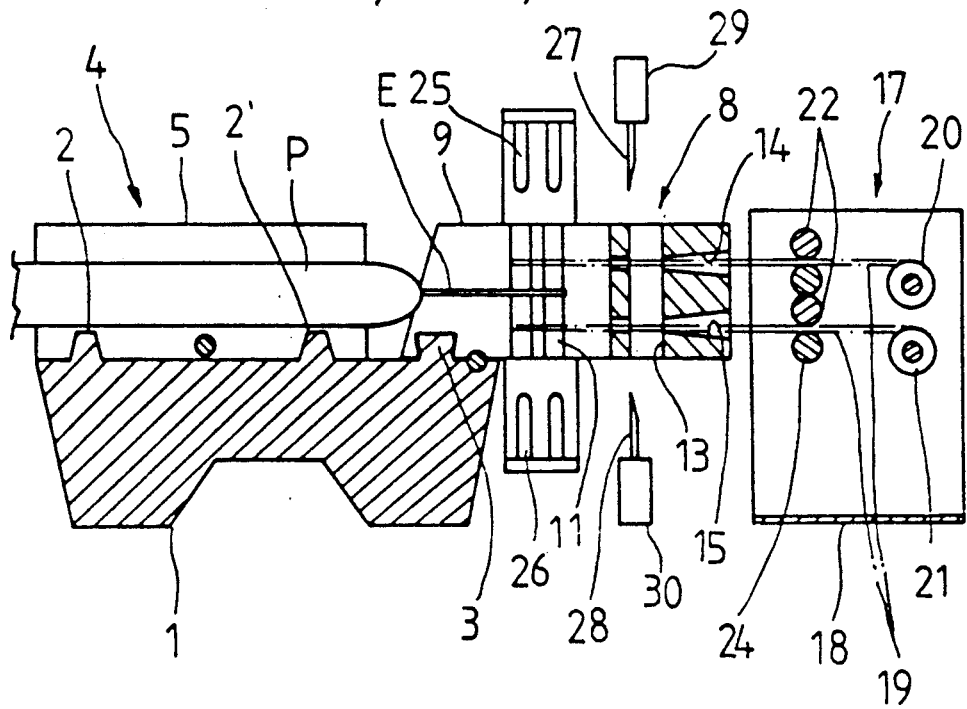
FIG. 3 is a cross-sectional view of the central portion of the inventive apparatus.

As the driving roll 24 is rotated by means of the driving means 23, the rolls 22 are also rotated to move the nickel leads 19 between the rolls 22, 24 leftwise in FIG. 3, so that the leads may be inserted in the opening 10 via the lead passages 14 and 15 formed in the moveable block 9. When the nickel leads 19 are disposed over and below the tungsten electrode E, the driving means 23 is stopped to stop the moving of the nickel leads 19. (see FIG. 3) Then, the electrodes 25 and 26 are guided into the opening via the vertical grooves 11 and 12 so as to spot-weld the tungsten electrode E and the free ends of the nickel leads 19. For precise welding, it is desirable to make the width of the opening 10 narrow. Thereafter, the cylinders 29 and 30 are operated for the cutting blades 27 and 28 to be inserted in the cutting aperture 13 and properly cut the nickel leads 19 so as to finish the welding process. The other end of the mercury vapour lamp may be similarly processed as described above.

As is evident from above, the present invention automatizes the welding and cutting of the leads so as to simplify the process, and easily centers the electrodes of the mercury lamp and the leads so as to accomplish a precise welding, thereby regularizing the products and increasing the production efficiency.

What is claimed is:
1. An apparatus for welding leads to electrodes of a mercury vapour lamp or the like, said apparatus comprising:

a base, means for clamping a lamp to said base, a block associated with said clamping means and having passages for passing said leads to said electrodes, a lead supplying mechanism for introducing said leads from bobbins into said lead passages, and means associated with said block for welding said leads to said electrodes and for cutting said leads.

2. An apparatus according to claim 1, wherein said base comprises guide rails, and said clamping means comprises a fixed jaw, and a movable jaw movable along said guide rails.

3. An apparatus as claimed in claim 1, wherein said block has a horizontally extending opening for receiving the electrodes, semi-circular vertical grooves for said welding means, formed on both sides of said horizontally extending opening, a cutting aperture vertically formed near said opening, said lead passages extending from a side adjacent said bobbins to said horizontally extending opening.

4. An apparatus according to claim 3, wherein said passages are tapered toward said opening.

5. An apparatus according to claim 1, wherein said clamping means is adapted to clamp the lamp.

6. An apparatus according to claim 5 where said lead supplying mechanism is free of clamping means and includes rollers for advancing said leads into said lead passages to dispose the leads over and under the lamp affixed by said clamping means.

* * * * *